United States Patent [19]

Mason, Jr. et al.

[11] 4,327,521

[45] May 4, 1982

[54] SYSTEM FOR INCREASING THE GROWTH POTENTIAL OF HEDGE-ROW CULTURED PERENNIAL CROP PLANTS

[75] Inventors: Stanley I. Mason, Jr., Weston, Conn.; H. William Scheld, Houston, Tex.

[73] Assignee: Simco, Inc., Weston, Conn.

[21] Appl. No.: 200,258

[22] Filed: Oct. 23, 1980

[51] Int. Cl.³ .................. A01G 1/00; A01D 55/00
[52] U.S. Cl. ............................... 47/58; 47/4; 56/234
[58] Field of Search .................. 47/4, 58, 46; 56/233–237

[56] References Cited

FOREIGN PATENT DOCUMENTS

| | | | |
|---|---|---|---|
| 2283629 | 3/1976 | France | 56/235 |
| 395040 | 1/1974 | U.S.S.R. | 56/233 |
| 613739 | 7/1978 | U.S.S.R. | 47/58 |
| 615891 | 7/1978 | U.S.S.R. | 47/58 |
| 704515 | 12/1979 | U.S.S.R. | 56/237 |
| 719556 | 3/1980 | U.S.S.R. | 47/4 |
| 727174 | 4/1980 | U.S.S.R. | 56/234 |

*Primary Examiner*—Robert E. Bagwill
*Attorney, Agent, or Firm*—Haynes N. Johnson

[57] ABSTRACT

A system for growing and harvesting perennial, hedge-type, harvestable plants is provided which permits greater utilization of sunlight for photosynthesis, more efficient use of the land, and control of evapotranspiration through wind control. The plants are in rows, running in a substantially east-west direction, and are cut and harvested so that their "sun" surface(s) is not horizontal, but, rather, faces the direction of the sun's rays during the peak growing time of the day throughout the prime growing season of the year. The surface is generally cut to expose a maximum growing surface of the plant to sunlight and in this sense is analogous to solar collectors in solar home or hot water heating systems. The rows of plants are so spaced relative to adjacent rows to permit sunlight to fall on most of the planar surface of the hedge, but such that one row will not cast a dense shadow on a portion of another row. The rows are oriented in a generally east-west direction but specifically, the orientation may be varied to be non-parallel or even perpendicular to the prevailing wind direction in order to preserve water by reducing wind velocity and sheltering the major portion of the transpiring surface. A vehicle is provided for harvesting the upper portions of the plants so that the upper planar surfaces of the portions of the plants remaining after harvesting are at an angle which exposes a maximum surface area of the upper planar surfaces to sunlight during the peak growing time of the day throughout the following growing season.

10 Claims, 9 Drawing Figures

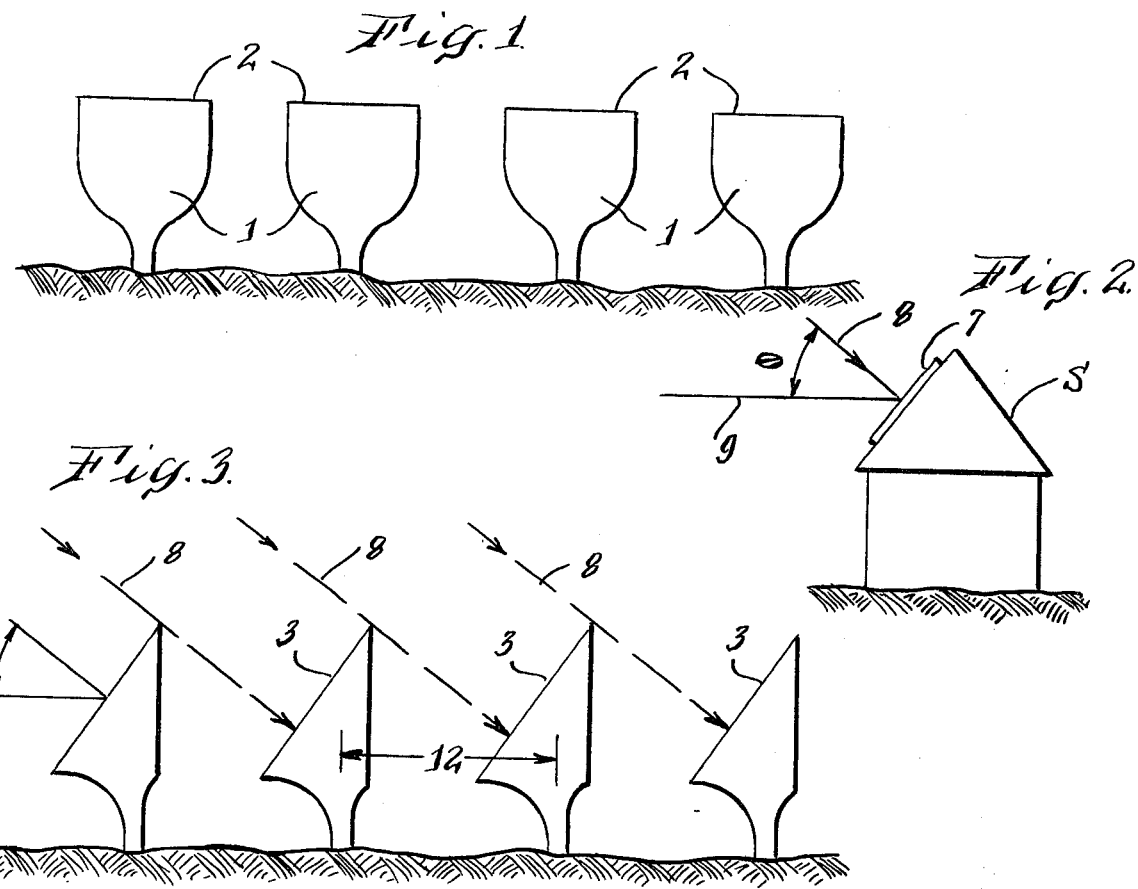
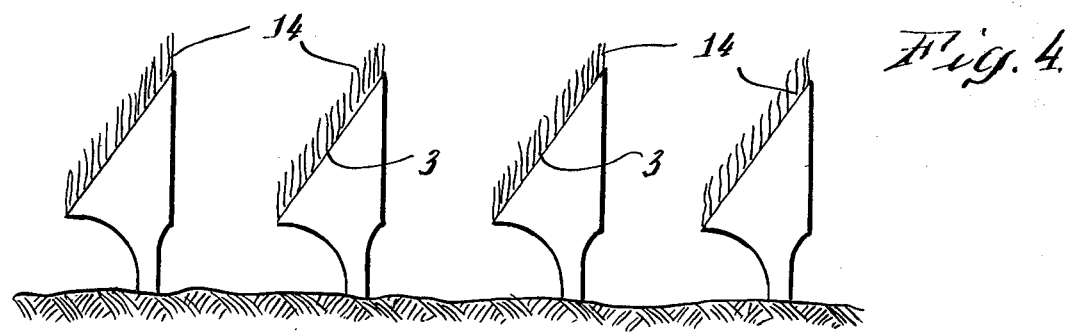
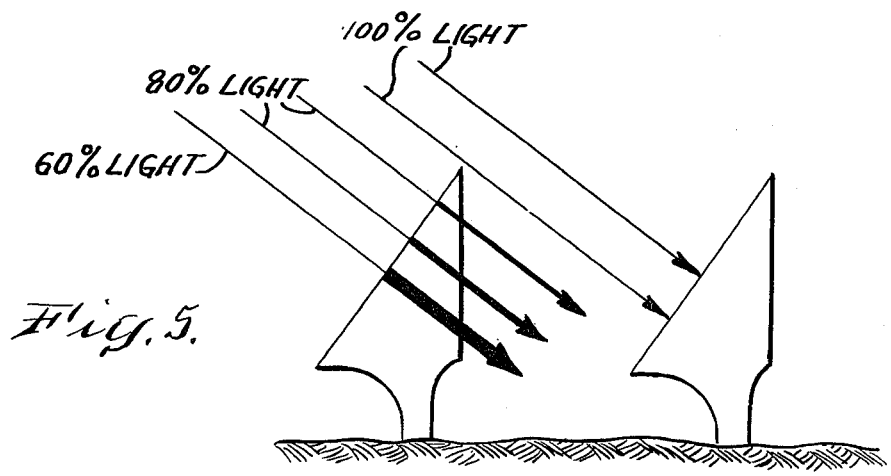

SYSTEM FOR INCREASING THE GROWTH POTENTIAL OF HEDGE-ROW CULTURED PERENNIAL CROP PLANTS

BACKGROUND OF THE INVENTION

Perennial plants such as tea, are often raised in hedges, row on row. These tea hedges are approximately four feet high by six feet wide, with one foot, or enough space between rows for harvester wheels, cultivators and other farm implements to have easy access. They are harvested by passing a high wheeled tractor, which has a cutter bar to snip the tea flush from the top of the hedge, over the rows. A vacuum collector then sucks up the harvested leaves, stems, and other material into a container trailer following the cutting bar equipment.

In this system of growing hedge-type, harvestable perennials, the upper planar surface of the plants is substantially horizontal. This means that the light from the sun strikes the top of the hedge row at an angle, and also strikes the southerly side of the edge of the top of the hedge, and the ground between the rows.

Primary growth of the harvestable portion of the plant occurs on its upper planar surface. When this upper planar surface is flat, as in the known growth systems, the growth area for the crop is limited.

Also, the orientation or arrangement of the rows of plants in known systems do not take into consideration such factors as prevailing wind direction and row spacing to enhance crop growth.

It is an object of the invention to utilize such factors as the angle and orientation of the upper planar surface of harvestable plants, row spacing and prevailing wind direction, to provide a system for growing and harvesting plants which increases the growth area of the plant and enhances the productivity of the crop.

SUMMARY OF THE INVENTION

The invention involves the orientation of hedge-row planting to maximum exposure of the upper growth surface area of a harvestable plant to the sunlight available during the peak growth time of the day and during the prime growing season of the plant, and then orienting the overall row configuration to be non parallel or even perpendicular to the direction of the prevailing wind during the prime growing season for moisture retention purposes.

The upper planar surface of the harvestable plant is cut at an angle, not horizontally or flat, in order to increase the available crop growth surface area of the upper planar surface. Furthermore, the rows of plants are oriented so that the angular upper planar surfaces of the plants generally face the direction of impinging sunlight during a predetermined time period of the day (e.g. the most active plant growth time) to expose a maximum surface area of the upper planar surface to sunlight. Accordingly, the angular cut on the plant provides both a greater growth area for the harvestable portion of the plant (the crop) and orients this greater growth surface area to more directly face the impinging sunlight during the peak growth time of the day throughout the growing season of the plant.

In another aspect of the invention, the spacing between rows of hedges is determined so that one row will not block more than a predetermined quantity of impinging sunlight from the next adjacent row behind it.

A harvester vehicle is provided so that the crop (or upper portion of the plant) can be harvested or removed at a predetermined angle so that the remaining portion of the plant has an angled upper planar surface to increase crop photosynthetic surface during the next growing season.

BRIEF DESCRIPTION OF THE DRAWINGS

FIG. 1 is a side elevation looking down the rows. It shows a prior art hedge having a flat, horizontal upper surface.

FIG. 2 is a simplified view of the roof of a house, showing a solar collector and the angle at which the sunlight hits the solar collector.

FIG. 3 is similar to FIG. 1 and shows one angle of the planar surface(s) relative to the solar altitude angle, using the invention.

FIG. 4 is similar to FIG. 3 and shows the growth of the hedge, the "crop," just prior to harvesting.

FIG. 5 is a diagram showing simplified light rays filtering through the top of trees similar to those in FIG. 4.

DETAILED DESCRIPTION OF THE INVENTION

Figure 6:
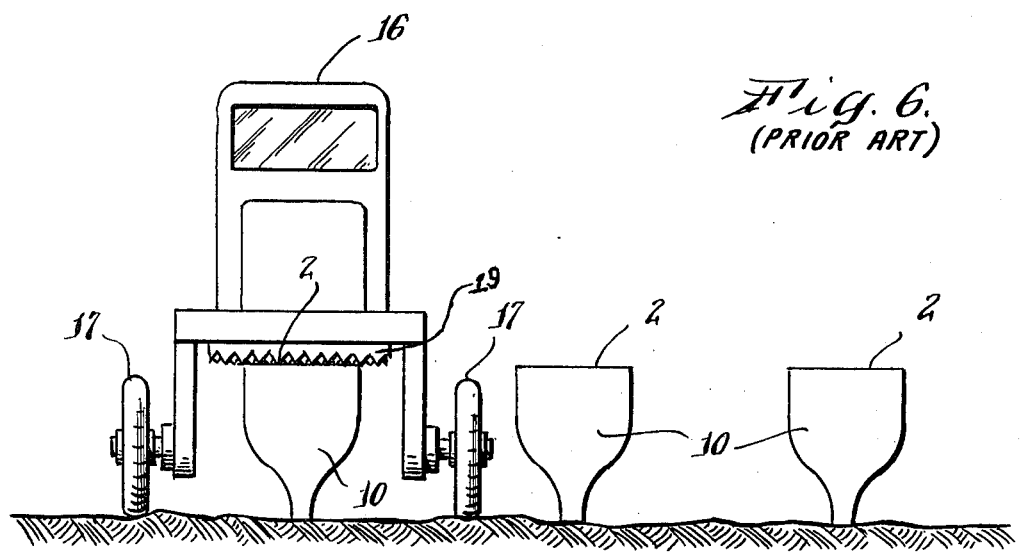
FIG. 6 is a side elevation looking down the rows, and shows a harvester blade as it would be used to harvest the prior art type of crop.

The invention relates to a new system of horticulture directed to increasing the efficiency with which certain plants can be grown, and thus more efficiently utilizing the land. In essence, it provides for increasing the crop growth upper surface area of the plant and also increasing the exposure of that surface area to the available sunlight for photosynthesis and gas exchange.

Stated in its most simple terms, the invention involves an adaptation of basic solar heating principles to horticulture. Just as there is a most efficient angle and direction for solar collector units, such as those mounted on the roof of a house, there is a most efficient angle for the planar surface of harvestable plants. Just as there are shading devices to control the amount of sunlight entering a collector unit or window during designated times of the year, there is a way to control the amount of shadow one row of plants casts upon an adjacent row. Thus it is possible to calculate row height and distance apart so that the lower levels of the plants receive no less than the amount of light they need for photosynthesis, and not so much more light that valuable space is wasted.

This invention is primarily useful on those types of plants which are perennials, can be grown in the form of a hedge, and are harvested by cutting off increments of growth from the hedge. Typical of such hedge-type crops is tea. Such plants are diagrammatically shown in the illustration of FIG. 1, an endwise view down four rows of such plants. The plants 1 have horizontal upper planar surfaces 2 as they would just after the crop has been harvested. The following increments of growth will be upward from surface 2; and, at the end of the growing season, the crop is conventionally harvested by running a sickle bar or other cutting unit horizontally across the top of the plants, essentially in the same horizontal plane as the previous period.

The present invention orients the angle of the upper planar crop growth surface of the plant, and spaces and orients the direction of the rows of the plants in the field relative to both the solar altitude angle and the direction of the prevailing wind to optimize the plant yield per acre.

PRINCIPLES INVOLVED

The principles of the present invention can be best explained by reference to the solar collector shown in FIG. 2. FIG. 2 shows the roof 5 of a house having a solar collector 7 mounted on it. The collector is of the usual type, faces south, and is set at angle to best receive the sun's rays. The reference angle used is often referred to as the solar altitude angle, designated theta ($\theta$), and is the angle between the direction of the sun's rays 8 and the horizontal plane 9. (For purposes of this disclosure, the sun's rays are considered to be coming from the upper lefthand portion of the various drawings, a direction designated by the ray line 8). The collector is shown as being perpendicular to (normal to) the sun's rays 8 so as to receive the most direct sunlight and thus collect the greatest amount of solar energy per unit area.

The solar altitude angle $\theta$ used is that which will result in exposure of maximum surface area of the collector to the sun's rays at a predetermined time period during the day. The angle selected is not the same for all solar heating installations, nor would it be for all applications in the present invention. This is because, in the Northern Hemisphere, the sun rises in the east, swings in an arc through the south, and sets in the west; and the maximum height to which the sun rises varies with the location, i.e., the geographic latitude, and with the time of year.

The planar surfaces 2 of the plants 1 of FIG. 1 are no longer horizontal when the above principles are applied to the growing of crops. As shown in FIG. 3, these planar surfaces are cut at an angle to the horizontal which generally faces the direction of impinging sunlight at a predetermined time of the day.

Figure 9:
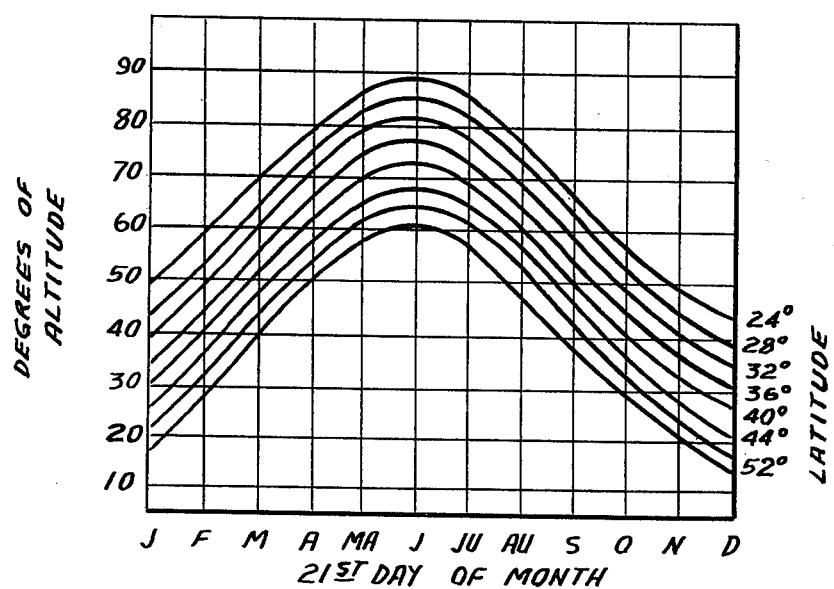
FIG. 9 is a graph showing altitude of the sun during the entire year at different latitudes.

It is appropriate at this point to discuss certain theory of plant function. It is generally believed that maximum or peak photosynthesis activity of a plant occurs during a specific time period of the day, namely between midmorning and mid-afternoon. As the day progresses and the temperature rises, photosynthetic activity decreases. Individual plants have different saturation levels of solar energy at which the plant attains maximum photosynthetic efficiency. In the type of plants with which the present invention is concerned, the crop growth (shown diagramatically as numeral 14 of FIG. 4) is in layers or tiers of leaves on twigs or stems forming the upper planar surface of the hedge. When a quantity of sunlight in excess of the saturation level, strikes the growing surface, the upper tiers or leaves tend to orient themselves so as to avoid or diffuse the excess sunlight. For example, the leaves of the upper edge of the crops may tend to orient themselves parallel to the sun's rays. To the contrary, the leaves of the lower levels of the plant, which may be in the shadow of the upper part of the plant or other rows of plants, may orient themselves more perpendicular to the impinging rays of sun to better absorb the now reduced solar energy. In any event, the plants have built in mechanisms which tend to assure that the different tiers of leaves receive the required saturation level of solar energy but not substantially more than required. Thus, it may be desirable to orient the upper surfaces of the plants to be normal to the impinging rays of sun (during the peak photosynthesis activity time of day) during some seasons, and more parallel to the sun's rays at other seasons. As a general rule, the upper planar surfaces of the plant hedge should be normal to the sun's rays in the fall and spring, when sunlight is relatively scarce, and not normal to the sun's rays during the summer when sunlight is more intense. On the same theory, the upper planar surfaces should be more normal to the sun's rays at distant latitudes from the equator, and less normal to the sun's rays at latitudes nearer the equator. FIG. 9 illustrates a graph showing altitudes of the sun during the entire year at different latitudes. The solar altitude angle for a specific season (e.g. the growing season of the plant) may be calculated from determining the solar angle for the different months of the season and averaging or normalizing these values over the season.

Returning to the discussion of the drawings, in FIGS. 3 and 4 the planar surfaces 3 of the plants 1 are shown cut at an angle $\theta$ relative the sun's rays 8. For illustrative purposes, the angle $\theta$ is shown as being the angle at which the sun's rays strike the planar surfaces 3 in a normal direction. This particular angle $\theta$ is intended to be illustrative only, and not restrictive of the invention. Reference numeral 12 of FIG. 3 is intended to illustrate a generally east-west orientation of the rows of crops.

FIG. 4, which is similar to FIG. 3, illustrates the harvestable crop 14 growing from the angular upper planar surfaces 3 of the plants after the growing season of the plants, but before harvesting. In both FIGS. 3 and 4, the upper planar surfaces 3 of the plants are cut so that those surfaces generally face the direction of impinging sun rays, for the specific latitude of the plant, during the peak photosynthetic activity period of the day, namely between approximately 10:00 A. M. and 2:00 P. M. In the Northerm Hemisphere, the direction of impinging sunlight during this daily peak activity period is generally southerly.

Two factors become apparent from FIGS. 3 and 4. First, cutting the upper planar surface of the plant at an angle relative to the horizontal provides increased surface area for crop growth of the plant. That is, the surface area of the angled upper planar surfaces 3 of the plants of FIGS. 3 and 4 are geometrically larger than the horizontal upper planar surfaces 2 of the plants of FIG. 1. Secondly, the angle of the upper planar surfaces 3 exposes a maximum surface of that crop growth area to the direction of impinging sunlight during the peak photosynthetic activity time period of the day. Thus, the embodiments of FIGS. 3-4 enhance plant growth in two distinct ways; by providing an increased crop growth surface and orienting that surface to efficiently utilize available sunlight for photosynthesis.

To implement the above discussed features, the solar altitude angle for the latitude of the plant is calculated from a table, such as the one illustrated in FIG. 9, for the growing season of the plant at the time of day when peak photosynthesis activity occurs. The angle used may be an average angle calculated over the entire growing season. Once the angle is determined, the upper surface of the plant is cut so that it generally faces the sunlight at the peak photosynthetic activity time of the day throughout the growing season.

The system provided by the present invention further contemplates the use of the spacing between the rows of hedges to promote crop growth. The spacing of the rows, which run in a generally east-west direction, is such that one row will not be so close to another so as to cast a dense shadow on the growth surface of the row behind it, but needs to be no further apart than is necessary to accomodate the wheels of a harvesting vehicle driving between the rows.

As discussed above, individual types of plants have certain saturation level requirements of sunlight for efficient photosynthetic operation. These requirements can vary from about 10% of full sunlight to 90% of full sunlight. The spacing of the adjacent rows is determined in accordance with the individual needs of the specific type of plants being grown, and is calculated so that one row of plants will not block more than the saturation level of light needed during the peak photosynthetic activity period of the day from the adjacent rows behind it.

FIG. 5 schematically illustrates the intensity of the sun's rays at different times of the year during the same time period of the day. The orientation of the plants and the spacing of the rows of plants is determined so that the plants will receive at least their saturation level of sunlight during the daily peak photosynthetic activity period throughout the year. In any event, the preferred embodiment of the present system contemplates that the upper planar surfaces of the plants with directly face impinging sun rays during the peak daily photosynthesis activity period of the plant throughout the entire growing season of the particular type plant.

The rows of plants do not always run in a strictly east-west direction, due to problems such as the need for contour farming; but a substantially east-west direction is preferable for sun exposure, *except*, as it may be necessary to vary the direction due to prevailing winds. If the prevailing winds are such that they would usually run parallel along the row, greater evapotranspiration would occur. The nearer the rows can be to normal to the direction of the prevailing wind, the less evaporation occurs due to shelter-belt effect. Consequently, adjustments in the direction of the rows can be made to cut down wind flow by orienting the rows perpendicular to wind direction as long as such changes do not appreciably affect the receipt of sunlight on the planar surfaces. For example, rows may vary by as much as ten degrees from true east-west and the reduction in received sunlight is only about two percent; the angle of the sun-facing planar surface of the plant can be adjusted to increase sun exposure even when the rows are not strictly east-west.

The amount of rows may deviate from east-west orientation will depend on climate. A tropical rain area may require less concern for water preservation than for sun, so the rows will deviate only slightly, if at all, from east-west, just as a dry area may require more water retention, and thus deviate from east-west as much as is practical, to be primarily perpendicular to the wind direction. Of course, if a climate is primarily moderate, the rows would be oriented at an average angle between the direction of desired sun exposure and prevailing wind.

It has been found that in locations where the prevailing winds are substantial, control of the prevailing winds can increase plant produtivity by approximately 20% and effect significant reduction in energy-dependent irrigation costs because of prevention of excess transpiration. Furthermore, the angular cut of the planar surfaces of the plant, as discussed above, allow rows of plants to be located relatively close to the adjacent rows. This close bunching of the rows further enhances resistance to the prevailing winds, in addition to utilizing less land.

As discussed above, the growth of perennial plants is dependent upon many variables including row orientation, the angle at which the upper planar surfaces are cut, row spacing, the relative height of the rows of hedges, and the direction of the prevailing winds. The present invention orients, cuts and spaces the plants and rows so as to optimize the growth variables for a particular plant in a given latitude. The optimum value of some of the above mentioned variables can be determined experimentally in a laboratory as follows.

A source of light, as for example a lamp, can be used to simulate the position of the sun for a given latitude. A specimen of a specific type of hedge is positioned below the lamp on a light detector, and the lamp is moved relative to the hedge to simulate the apparent movement of the sun during a typical day in the growing season at the specific latitude desired. The shadow cast by the hedge can be visually observed, and the light meter is used to determine the specific percentage of light that passes through the hedge at various times of the simulated day and at various positions proximate to the hedge. The data determined by this test is useful for planning the spacing between the rows of hedges to meet the previously discussed requirement that the spacing of the rows is such that each row receives at least its saturation level of the light from the source.

The test may also be used to determine the amount of impinging light blocked by a row of hedges as a result of cutting the top planar surfaces of the plants at various angles relative to the horizontal, and furthermore, to determine the optimum relative height of the various rows of hedges with respect to each other for absorption of an optimum quantity of sunlight for each row. These variables are experimentally determined as discussed above; by using a lamp to simulate the apparent travel of the sun and observing the shadows and measuring the light transmitted at various locations proximate to the simulated rows of hedges of the plant being tested.

HARVESTING

FIG. 6 shows the customary past way of harvesting crops of this nature.

A tractor 16 has wheels 17 spaced apart a sufficient distance so as to pass between rows while cutting plants 10. A horizontal cutting bar 19 is mounted to the bottom surface of the tractor. As the cutting bar passes over the plants, it cuts the upper planar surfaces 2 of the plants 10 flat or horizontally.

Figure 7:
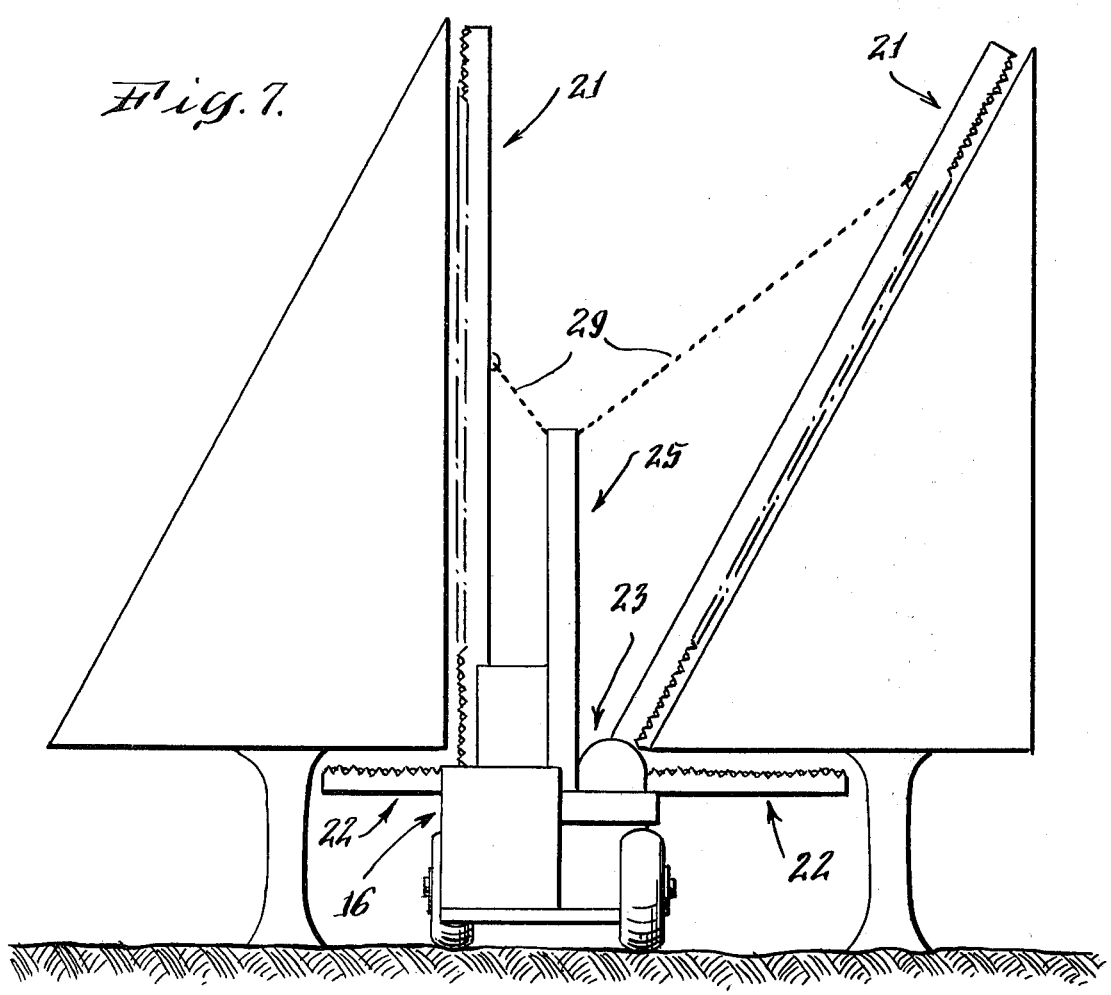
FIG. 7 is a side elevation looking down the rows using the harvester blades incorporating the invention. These are a series of cutting arms, one or more for each side of the tree facing in between the row, and more for cutting the undersides of tall trees.

The harvesting tractor combination of the type shown in FIG. 6 cannot be used with the crop growing system of this invention because of the angle of planar surfaces 3 (FIGS. 3–5) and the added height of plants created by this method of horticulture. More importantly, a horizontal bar, such as bar 19, cannot be used since each row of plants must be cut with planar surfaces 3 at angles, not horizontally. Consequently, tractor 16 must be provided with one or more separate, pivotally adjustable, sickle bars 21, as shown in FIG. 7. In the preferred embodiment, the vehicle includes at least two sickle bars 21, at least one for each of the two facing planar surfaces between each row, means for adjusting their angles to the desired predetermined angles for planar surfaces 3, means 22 for trimming underside of taller trees, and means for boosting operating power through a large, extendable cutting bar.

Figure 8:
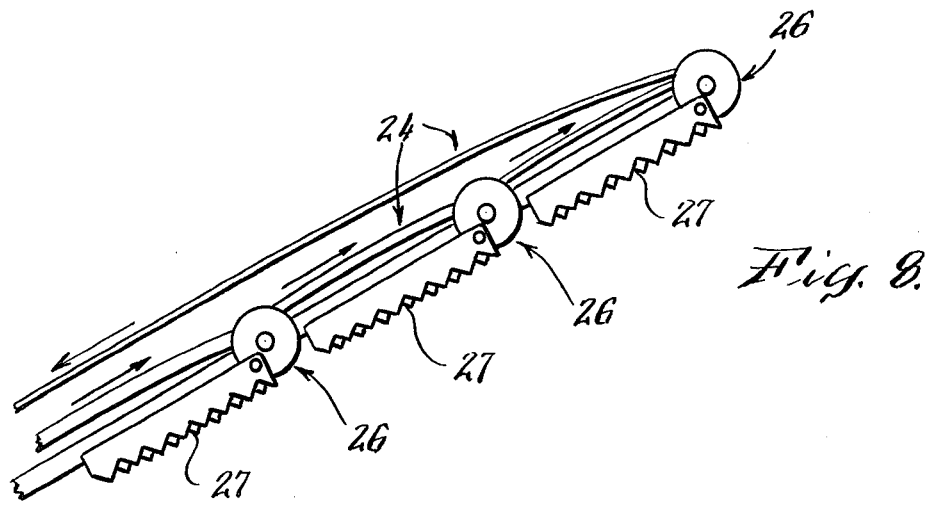
FIG. 8 shows the scheme of a hydraulic-powered arm that may be used in the harvesting machine of FIG. 7.

One way to construct the tractor is by using major hydraulic power arms, shown with tractor 16. Two or more sickle bars 21 extend from pivoting bases 23, a sufficient distance to cut trees 25' high, and a number of lesser arms 22 extend horizontally at either side of tractor. They are powered by a hydraulic-driven gear motor source in the tractor, which in turn powers small hydraulic motors 26 placed at even intervals along the length of the arms. Each motor moves an independent section of oscillator cutting blades 27 comprising the sickle bars 21 or the smaller arms 22, as shown in FIG. 8, and powered by hydraulic pressure in a cyclic system: liquid propelled through transport tubes 24 is directed successively through every motor and returned directly to the power source from the last motor in the series.

Each independent cutting section 27 of the arms 22 or sickle bars 21 may be constructed so as to be capable of disengaging entirely from the sickle bar or the arm, or sliding over preceding sections, so that each sickle bar or arm may be lengthened or shortened for different uses. Additionally, forming the arms and sickle bars from independent, interconnected segments tend to reduce the flexibility or resilience of these arms and bars which is a desirable feature. Otherwise, flexing of the arms or bars would affect the precision and angle at which the crops are cut. Adjacent to each sickle bar or arm is an air suction ramp (not shown) for collecting and transporting leaves, stems and harvested material to a container truck following the tractor.

Angular adjustment of the sickle bars 21 relative to the ground may be accomplished in various ways. The preferred form involves a vertical bar 25, shown in FIG. 7, to provide support and adjustability by conveying cables or chains 29 to the upper portions of each sickle bar 21. Thus the operator may control the angle of the sickle bars with an automatic or manual winch. A bar may adjust to the desired angle for the particular latitude and growing season of the particular crop, and then be pivoted into a vertical position so that the tractor may turn about and travel in the opposite direction in the adjacent row. If desired, an angle gauge, such as a protractor, may be associated with the inner section of linkage pivots for ease in setting the specified desired angle.

Uneven ground can cause large relative movement of cutter-bars at the extreme tope of the tree being harvested; thus cutter bar direction and stability are maintained by computor-controlled feedback systems.

The above described embodiments of the invention provide apparatus and methods for growing and harvesting harvestable, perennial plants by consideration of such factors as the solar angle during the growing season, the direction of the prevailing wind during the growing season, and the spacing and height of the rows of plants to be grown and harvested. In the preferred embodiments of the invention, as discussed above, the upper portions of the plants are cut so as to define an angular upper planar surface which provides an increased growth area for the crop to be harvested and simultaneously exposes that increased surface area to the direction of the sun during the peak photosynthetic activity period of the day.

In any event, the description of the invention provided herein is intended to be illustrative of the invention, and not restrictive thereof, the scope of the invention being defined by the following claims and all equivalents thereto.

We claim:

1. A method of growing hedge-type, harvestable perennial plants to provide enhanced plant growth, enhanced utilization of available sunlight for photosynthesis, and more efficient crop yield per unit area of land, the steps of said method including:

planting said plants to be grown in at least one row, said row running in a substantially east-west direction, determining the solar altitude angle for the latitude and for the peak daily photosynthetic activity period during the growing season of the specific plant to be grown, said solar altitude angle being the angle defined between the sun's rays and the horizon, cutting the upper portion of said plants in said row at an angle so as to provide said plants with an upper planar surface that (1) increases the growth surface area for crops on said upper planar surface, and (2) is orientated so that it faces the direction of the sun during the peak daily photosynthetic activity period of said plant during said growing season, whereby said upper planar surfaces of said plants provide increased crop growth area which is oriented to receive at least a predetermined minimum quantity of sunlight during said growing period to provide enhanced photosynthetic activity for providing increased plant growth.

2. The method of claim 1 wherein the step of determining said solar altitude angle includes:

determining the length of said growing season of said plant, determining the specific solar altitude angles at specific time intervals during the growing period, normalizing said specific solar altitude angles throughout said specific time intervals.

3. The method of claim 1 further including the steps of:

planting a plurality of rows of said plant, spacing each of said rows a predetermined distance apart from the next adjacent row, determining the spacings between each adjacent row so that each preceding row does not block more than a predetermined quantity of the sunlight impinging upon said preceeding row from the next adjacent row.

4. The method of claim 1 further including the step of orientating said row of plants to control moisture retention of said plants by varying the substantially east-west direction of said row of plants such that said row is not parallel to the direction of the prevailing winds during the growing period.

5. The method of claim 4 wherein said orientation of said row of plants is varied to be normal to said prevailing winds.

6. The method of claim 4 wherein said angular orientation of said row of plants is varied by:

determining the degree to which the prevailing winds inhibit said plant growth when said row is planted in a substantially east-west direction and said planar surfaces of said plants are cut so that they face the direction of the sun during said peak daily photosynthetic activity period of said growing season, orienting the direction of said row to offset the effect of said prevailing winds without substantially reducing the quantity of sunlight stiking the upper planar surface of said plants at said peak daily photosynthetic activity period.

7. The method of claim 1 wherein said peak daily photosynthetic activity period is between approximately 10:00 A. M. and 2:00 P. M.

8. A method of harvesting hedge-type, harvestable, perennial plants to provide enhanced growth of the portion of said plants remaining after the upper portions of said plants have been removed, and enhanced utilization of available sunlight for photosynthesis for said remaining portion of said plants, the steps of said method including:

determining the solar altitude angle for the latitude and for the peak daily photosynthetic activity period during the growing season of the specific type plant to be harvested, said solar angle being the angle defined between the sun's rays and the horizon, cutting the upper portion of said plant to be harvested at an angle so as to define an upper planar surface on said remaining portions of said plant that is oriented to face the sun's rays during said peak daily photosynthetic activity period during the growing season of said plant to be harvested, whereby said upper planar surfaces on said remaining portion of said plants are oriented to receive at least a predetermined quantity of sunlight during the next growing season for providing enhanced growth of said plant.

9. A method of growing and harvesting hedge-type, harvestable perennial plants to provide enhanced plant growth, enhanced utilization of available sunlight for photosynthesis, and more efficient crop yield per unit area of land, the steps of said method including:

planting said plants in an at least one row, said row running in a substantially east-west direction, near the beginning of the growing season, cutting the upper portions of said plants in said row at a predetermined angle so as to define an upper planar surface on each of said plants, said predetermined angle being such that said upper planar surfaces generally face the direction of impinging sunlight during the peak daily photosynthetic activity period during the growing period of said plant, at the end of the growing season, harvesting the grown upper portions of the plants at a predetermined angle so as to define an upper planar hedge or crown surface on the remaining portions of said plants, said predetermined angle being such that the upper planar surfaces of the portions of the plants remaining after harvesting generally face the direction of impinging sunlight during the peak photosynthetic activity during the following growing period of the plants, whereby the upper planar surfaces of the plants are oriented to receive at least a predetermined quantity of sunlight during its growing seasons.

10. The method of claim 9 including the step of orienting said row of plants in a direction that is not parallel to the direction of the prevailing winds during the growing season of said plants to control moisture retention of said plants.

* * * * *